(12) United States Patent
Tschirhart et al.

(10) Patent No.: US 8,638,571 B2
(45) Date of Patent: Jan. 28, 2014

(54) CONTROLLER FOR A RESONANT POWER CONVERTER

(75) Inventors: Darryl J. Tschirhart, Newmarket (CA); Praveen K. Jain, Kingston (CA)

(73) Assignee: SPARQ Systems Inc., Kingston, ON (CA)

( * ) Notice: Subject to any disclaimer, the term of this patent is extended or adjusted under 35 U.S.C. 154(b) by 302 days.

(21) Appl. No.: 13/030,737

(22) Filed: Feb. 18, 2011

(65) Prior Publication Data

US 2011/0205761 A1 Aug. 25, 2011

Related U.S. Application Data

(60) Provisional application No. 61/282,495, filed on Feb. 19, 2010.

(51) Int. Cl.
*H02M 3/335* (2006.01)
(52) U.S. Cl.
USPC .............................. 363/17; 363/95
(58) Field of Classification Search
USPC .......... 323/235, 282, 283; 363/16–20, 25, 40, 363/89, 95, 98, 132, 21.02, 21.06, 21.16
See application file for complete search history.

(56) References Cited

U.S. PATENT DOCUMENTS

| | | | |
|---|---|---|---|
| 4,967,332 A * | 10/1990 | Claydon et al. | 363/17 |
| 5,075,836 A | 12/1991 | Suzuki et al. | |
| 6,151,231 A | 11/2000 | Saint-Pierre et al. | |
| 7,158,392 B2 * | 1/2007 | Hosokawa et al. | 363/21.06 |
| 7,599,198 B2 * | 10/2009 | Tao et al. | 363/17 |
| 7,773,398 B2 * | 8/2010 | Kyono | 363/127 |
| 2009/0213623 A1 | 8/2009 | Yang | |

FOREIGN PATENT DOCUMENTS

EP 1047178 A2 10/2000

OTHER PUBLICATIONS

International Search Report for International Application No. PCT/CA2011/000196 filed on Feb. 18, 2011.
Written Opinion for International Application No. PCT/CA2011/000196 filed on Feb. 18, 2011.
R.L. Steigerwald, A Comparison of Half-Bridge Resonant Converter Topologies, IEEE Trans. Power Elec., vol. 3, pp. 174-182, Apr. 1988.
P.K. Jain, et al., Asymmetrical pulse-width-modulated resonant DC/DC converter topologies, IEEE Trans. Power Elec., vol. 11, pp. 413-422, May 1996.
S. Pan, et al., Secondary-side adaptive digital controlled series resonant dc-dc converters for low voltage high current applications, in IEEE Proc. Power Elec. Specialists Conf., 2008, pp. 711-717.
S. Dalapati, et al., Control of a series resonant converter by pulse density modulation, in Proc. IEEE India Annual Conf. (INDICON), 2004, pp. 601-604.

(Continued)

*Primary Examiner* — Rajnikant Patel
(74) *Attorney, Agent, or Firm* — Stephen J. Scribner

(57) ABSTRACT

This invention relates to circuits and methods for controlling a resonant power converter. Control of the power converter may comprise comparing an output voltage or current of the converter to at least one reference voltage or current; enabling primary side switching signals based on a first selected result of the comparison; and disabling primary side switching signals based on a second selected result of the comparison; wherein a primary side switching signal for each primary side switch includes at least one off-on-off transition.

20 Claims, 16 Drawing Sheets

(56) References Cited

OTHER PUBLICATIONS

H. Fujita, et al., Pulse density modulation based power control of a 4 kW 400 kHz voltage-source invertor for induction heating applications, in IEEE Proc. Power Conversion Conf., 1993, pp. 111-116.

H. Koizumi, et al., Analysis of class d inverter with irregular driving patterns, IEEE Trans. Circuits and Sys., vol. 53, pp. 677-687, Mar. 2006.

Y.-H. Liu, et al., Digital dimming control of CCFL drive system using pulse density modulation technique, in Proc. IEEE Region 10 Conf., 2007, pp. 1-4.

* cited by examiner

CONTROLLER FOR A RESONANT POWER CONVERTER

RELATED APPLICATION

This application claims the benefit of the filing date of U.S. Provisional Patent Application No. 61/282,495, filed 19 Feb. 2010, the contents of which are included herein by reference in their entirety.

FIELD OF THE INVENTION

This invention relates to a control technique for controlling a resonant power converter. The control technique provides high efficiency through pulsed operation, lossless switching when the converter is on, and a variable pulse density modulation period so as to achieve fast transient response with minimal filter size.

BACKGROUND

Resonant converters have many advantages over pulse-width modulated (PWM) converters due to their ability to achieve near lossless switching. This allows high switching frequency to be realized, thereby allowing miniaturization of the reactive components. Of voltage-type or current-type resonant converters, current-type topologies are the most advantageous because the primary switches achieve zero-voltage switching (ZVS), the rectifiers achieve zero-current switching (ZCS), and the capacitive output filter enables a fast response to load steps in highly dynamic applications. The most popular and most efficient current-type resonant converter is the series resonant converter (SRC). It has all the merits mentioned above, plus the lowest component count. This is especially true at high frequency where transformer leakage inductance may be used as the resonant inductor, thereby eliminating the need for a separate inductor.

However, despite these advantages, industry is reluctant to make the switch from PWM to resonant topologies, largely due to practical implementation issues that lead to increased size, and issues of control. Power conversion techniques currently employed in the design of information processing equipment therefore suffers from drawbacks including poor reduced-load efficiency and low power density.

SUMMARY

Described herein is a technique for controlling a resonant converter. In one embodiment control of a resonant converter includes exciting the tank circuit of the converter with a constant frequency, symmetrical voltage or current, so that high efficiency and load regulation are maintained across the load range; component optimization at multi-megahertz switching frequencies is possible; and load transients are substantially reduced. The control technique is suitable for voltage regulator applications; such as in portable/mobile systems where small size and light weight are desirable. A series resonant converter with control as described herein may use less than one third of the capacitance required by a conventional two phase buck converter.

The on/off nature of pulse density modulation (PDM) permits high efficiency to be obtained across a wide load range for a given application. However, when applied to a power converter, the benefit comes at the expense of size and transient performance, particularly in the case of DC/DC converters. The embodiments described herein overcome these drawbacks by employing an alternative form of PDM wherein the converter dictates on and off periods. As with traditional PDM, the benefit of high efficiency is maintained through pulsed operation, and lossless switching when the converter is on. However, as described herein, by not fixing the PDM period, fast transient response is achieved with minimal filter size.

Described herein is a method of controlling a resonant power converter, comprising: comparing an output voltage or current of the converter to at least one reference voltage or current; enabling primary side switching signals based on a first selected result of the comparison of the converter output voltage or current and the at least one reference voltage or current; and disabling primary side switching signals based on a second selected result of the comparison of the converter output voltage or current and the at least one reference voltage or current; wherein a primary side switching signal for each primary side switch includes at least one off-on-off transition.

In one embodiment the primary side switching signals for a pair of primary side switches may be edge-synchronous, opposite polarity, and have 50% duty cycle.

In another embodiment the method may include deriving a frequency of the primary side switching signals from a clock frequency. The on period of a primary side switching signal may be an integer multiple of the clock period and may be synchronized with the clock. The off period of a primary side switching signal may be an integer multiple of the clock period and may be synchronized with the clock. The method may include using a counter to derive the switching frequency from the clock frequency. The counter may begin counting at a next clock edge upon receiving the first selected result of the comparison. The next clock edge may be positive. The first selected result of the comparison may be when the converter output voltage or current falls below at least one reference voltage or current. The clock frequency may be a multiple of the switching frequency and the primary side switching signals may be enabled with a delay of less than one switching cycle. The method may include disabling the primary side switching signals according to the second selected output of the comparison when a converter switching cycle is complete. The primary side switching signals may be disabled with a delay of less than one switching cycle. In one embodiment enabling and disabling the primary side switching signals turns the converter on and off, respectively, with zero current transitions, and maintains zero voltage switching or zero current switching while the converter is on. The method may include controlling two or more phases of resonant converters.

Also described herein is a controller for a resonant power converter, comprising: a comparator that compares an output voltage or current of the converter to at least one reference voltage or current and generates results based on the comparison; a means that enables primary side switching signals based on a first selected result of the comparison; and a means that disables primary side switching signals based on a second selected result of the comparison; wherein a primary side switching signal for each primary side switch includes at least one off-on-off transition.

In one embodiment the primary side switching signals for a pair of primary side switches may be edge-synchronous, opposite polarity, and have 50% duty cycle. The means may derive a frequency of the primary side switching signals from a clock frequency. The primary side switching signals may be integer multiples of the clock frequency and may be synchronized with the clock. In one embodiment the controller may include a counter that derives the switching frequency from the clock frequency. The controller may control two or more phases of resonant converters.

Also described herein is a resonant power converter including a controller as described herein.

BRIEF DESCRIPTION OF THE DRAWINGS

For a better understanding of the invention, and to show more clearly how it may be carried into effect, embodiments will be described, by way of example, with reference to the accompanying drawings, wherein.

DETAILED DESCRIPTION OF EMBODIMENTS

Figure 1:
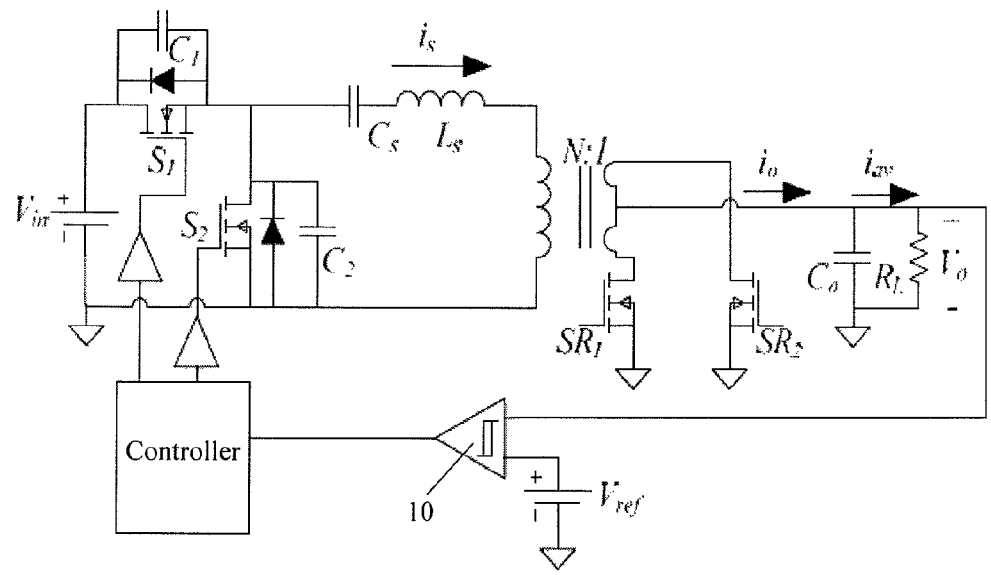
FIG. 1 is a generalized schematic diagram of a series resonant converter (SRC) with a controller according to one embodiment.

Various techniques for controlling an SRC have been proposed. For example, variable frequency (VF) control may be used, in which the switching frequency of the converter is adjusted to vary the impedance of the resonant tank, to regulate the output voltage. However, as the load decreases, regulation of the SRC is lost [1] and gate loss increases, reducing light-load efficiency.

Another control technique is constant frequency half-bridge, such as asymmetric pulse width modulation (APWM), where the resonant tank is fed with a unipolar quasi-square wave. The duty cycle of the square wave is varied to regulate the load voltage. This technique overcomes the regulation problem of VF control; however, it has a limited input voltage range for which ZVS can be achieved. This technique also suffers from problems with gate signal generation as the duty cycle decreases from 50% [2].

Another control technique using constant frequency is secondary-side control where the conduction difference between the diode rectifier and the synchronous rectifier is used to maintain constant output voltage [4]. However, allowing diode conduction reduces efficiency of the converter.

A third constant frequency control technique is pulse density modulation (PDM), where the converter operates in bursts being fully on or fully off. Implemented with analog control, the PDM frequency is much greater than the switching frequency, and a compensated error signal is compared to a PWM waveform to determine when the converter will be on or off. A downfall of this method is that the output filter and control loop are determined by the low PDM frequency, and not the high switching frequency. Therefore, high frequency switching may be implemented, but without any of the associated benefits. The most common use of PDM is for inverters, and is implemented digitally using look up tables [6, 8]. In such applications, output power is controlled, not voltage. By using digital control, the off-time is dispersed throughout the PDM cycle to minimize power fluctuations. This technique cannot be applied to dc/dc converters because it has similar control delay problems to analog implementation; and it only allows discrete power levels.

In pulse width modulation (PWM), fine output control is achieved in part by having fine control over the control pulse width. In conventional PDM, fine output control is achieved by varying the density of pulses. In one embodiment described herein, the on time of the converter is related to the switching frequency of the converter, such as an integer multiple of the switching frequency. If the switching frequency is suitably high, a fine degree of control is achieved. Both standard PWM and PDM control of a resonant converter involve operation of the converter at non-optimal conditions. However, in the techniques described herein, the resonant converter is operated at or close to its optimal switching frequency.

In general, resonant converters can be classified into one of two classes depending on what signal transfers power. Current-type resonant converters use a sinusoidal current; with the most common being the series resonant converter. Voltage-type converters transfer power on a sinusoidal voltage; with the two most common topologies being the parallel resonant and series-parallel resonant converters. Application of a control technique as described herein is not limited to one resonant converter type or another; and does not impede the inherent soft-switching of any resonant converter topology. In some applications a series resonant converter may be preferred due to its merits including: the primary-side switches achieve ZVS/ZCS, the rectifiers achieve ZCS, and a capacitive output filter is used rather than an inductive filter. Such features are topology-dependent, and independent of the control method used. Voltage-type converters do not have ZCS rectifiers, and are subject to reverse-recovery loss, which is topology-dependent.

Although embodiments are described herein mostly with respect to a half-bridge configuration, the control method is readily extended to full-bridge circuits. Rectifiers may be uncontrolled (e.g., a diode) or controlled (e.g., based on a transistor, such as a synchronous rectifier) without impacting the fundamental behaviour of the control technique.

The methods and circuits described herein include one or more of the following features: regulation of the RC from no-load to full-load; response limited by the converter and not the control loop; inherent stability; operation in the range of tens to hundreds of megahertz to allow further miniaturization and integrated power architectures.

The method does not suffer from the drawbacks of prior methods, such as slow control action or large filter requirements. The controller is implemented digitally and may use a clock that is a multiple of the desired switching frequency. The only input to the controller is the output of at least one comparator, such as a hysteretic comparator. According to an embodiment described herein, a SRC operated as voltage regulator achieves the efficiency benefits of conventional PDM control, while overcoming drawbacks of poor transient response and large filter size.

A generalized embodiment of a SRC with a controller as described herein is shown in FIG. 1. In this embodiment, a hysteretic comparator 10 is used to sense the output voltage $V_o$ of the converter, which is compared to a reference voltage $V_{ref}$, and the comparator output is used a command signal fed to the controller. Alternatively, the output current may be sensed, using techniques known in the art. Current sensing may be preferred in certain low-current applications, such as, for example, a controller for LED lighting, where control of the output current is desired. Output current sensing may conveniently be implemented in certain converter types, such as, for example, a voltage-type converter having an inductive output filter, where DC resistive sensing using the resistance of the output inductor may be used.

The controller may be implemented with one or more logic devices such as, for example, a counter or a flip-flop. A field programmable gate array (FPGA) or a complex programmable logic device (CPLD) may also be used. In one embodiment the hysteretic comparator 10 asserts a high command signal when the converter output voltage falls below a defined low threshold value, and sets the command signal low when the voltage rises above a defined high threshold value. The opposite may of course also be implemented. The controller produces the gating (i.e., switching) signals for the primary switches (e.g., MOSFETs) at the desired switching frequency when the comparator output is high. When the comparator output is low, the switching cycle is ended. In one embodiment, the controller allows the switching cycle to complete before ending the on period. The controller ensures that the switching signal for each switch of the primary switch pair (e.g., switches $S_1$ and $S_2$ of FIG. 1) includes at least one off-on-off transition.

In another embodiment the controller produces switching signals for the primary switches that are one or more of edge-synchronous, opposite polarity, and 50% duty cycle when the command signal is high (i.e., the switching signals are symmetric). In a further embodiment the controller ensures proper (i.e., steady-state) RC tank behavior if the command signal goes low in the middle of a cycle. This is achieved by completing the switching cycle at the desired switching frequency. For example, the RC tank may be driven with an integer multiple of switching cycles, wherein pulses are not truncated when the controller senses the off command from the comparator (e.g., when an output voltage of the RC exceeds the threshold voltage). That is, the controller waits for the switching cycle to complete before switching off.

When transitioning the RC from off to on, the comparator output switches from low to high. The controller, which may include a counter, begins counting at the next positive clock edge. Because the clock is a multiple of the switching frequency, the worst-case turn-on delay is one clock cycle which is less than the switching cycle. Here, "turn on delay" refers to the amount of time the controller waits before enabling the RC when an on command is received from the hysteretic comparator. In this embodiment the switching frequency is related to resonant frequency, and the switching period is an integer number of clock periods. The PDM period is the sum of the RC on-time and off-time. When transitioning the RC from on to off, the comparator output switches from high to low. To ensure a complete resonant cycle, the counter stops only if one switching period has been completed. Therefore, in the worst-case, the comparator output will go low just after a cycle has started, resulting in a one cycle delay.

Figure 2:
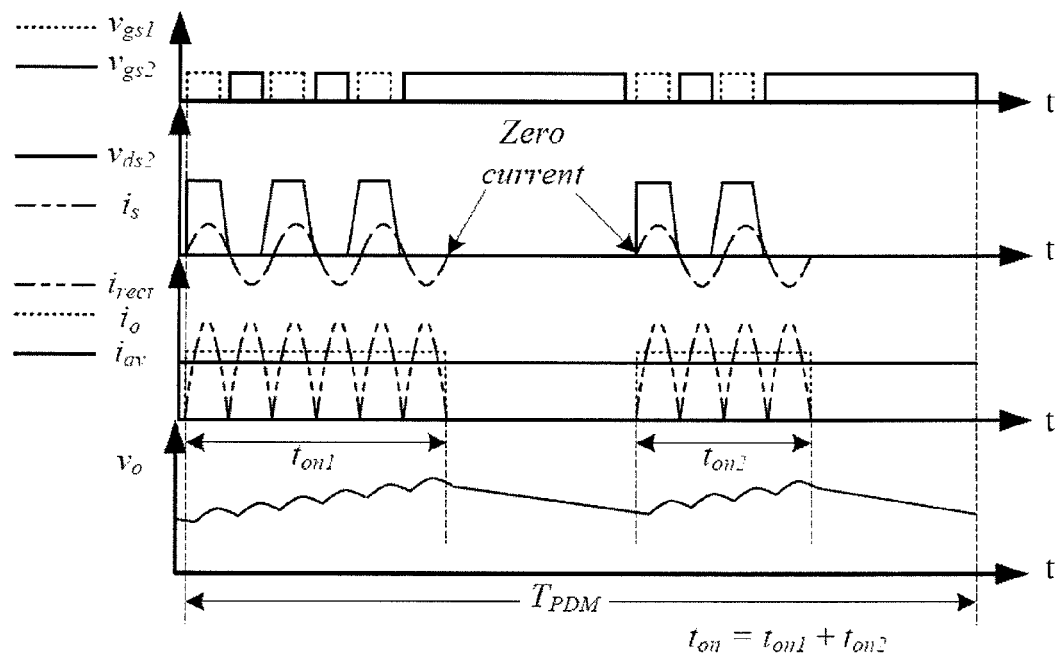
FIG. 2 is a plot of representative waveforms of an embodiment of the circuit of FIG. 1.

Representative waveforms are shown in FIG. 2; where the converter is on twice during two different durations in the PDM period. The on intervals start and end with zero current transitions, while maintaining zero voltage switching in the middle. In most prior applications ZCS is suboptimal because it leads to frequency-dependent output capacitance loss. However, with the control method described herein, the frequency at which ZCS occurs is much lower than the switching frequency, so the loss is almost negligible. By allowing the converter to dictate when energy is required, reduction of the low frequency ripple is achieved without sacrificing response.

Control of an SRC as described herein may be analyzed by defining the output currents according to FIG. 1. The pulse density duty cycle $D_{PDM}$ is defined by (1) as the ratio of the total on time to the total on- and off-time of the SRC. This is equal to the ratio of load current $i_{av}$ to the per-cycle average of the rectified resonant tank output current $i_o$.

$$D_{PDM} = \frac{\sum_k t_{on,k}}{\sum_k t_{on,k} + \sum_k t_{off,k}} = \frac{i_{av}}{i_o} \quad (1)$$

The equivalent ac resistance is a function of the pulse density duty cycle, and defined by (2), $$R_{ac0} = \frac{8N^2 R_L}{\pi^2},$$

where and N is the transformer turns ratio. The transfer function is given by (3), with the variables in the equation defined as $$Q = \frac{\omega_r L}{R_{ac0}};$$

$$\omega_r = \frac{1}{\sqrt{L_s C_s}};$$

and $$\omega = \frac{\omega_0}{\omega_r};$$

where $\omega_o$ is the radian switching frequency. The definitions of the resonant tank parameters Q and ω are identical to those used in standard converter analyses. Thus, setting $D_{PDM}$ to unity results in identical voltage transfer characteristics.

$$R_{ac} = \frac{8N^2 D_{PDM} R_L}{\pi^2} \quad (2)$$

$$R_{ac} = D_{PDM} R_{ac0}$$

$$\frac{V_o}{V_{in}} = \frac{D_{PDM}}{2N\left[D_{PDM} + jQ\left(\omega - \frac{1}{\omega}\right)\right]} \quad (3)$$

The voltage stress of the resonant components normalized to $V_{in}$ are given by (4) and (5). Both are inversely proportional to $D_{PDM}$ and are equal to the values under traditional control methods at unity pulse density duty cycle.

$$\frac{V_{Cs}}{V_{in}} = \frac{2Q}{D_{PDM}\pi(Q(\omega^2 - 1) + j\omega)} \quad (4)$$

$$\frac{V_{Ls}}{V_{in}} = \frac{j2Q\omega}{D_{PDM}\pi\left(1 + jQ\left(\omega - \frac{1}{\omega}\right)\right)} \quad (5)$$

Figure 3A:
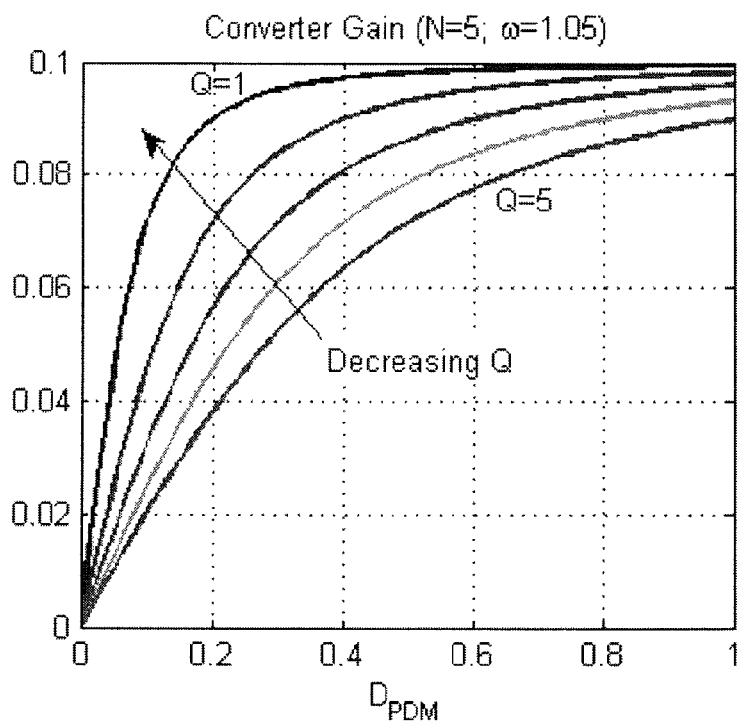
FIGS. 3A and 3B are plots of voltage transfer characteristics for an embodiment of the circuit of FIG. 1, for $\omega=1.05$ and $\omega=1.25$, respectively.
Figure 3B:
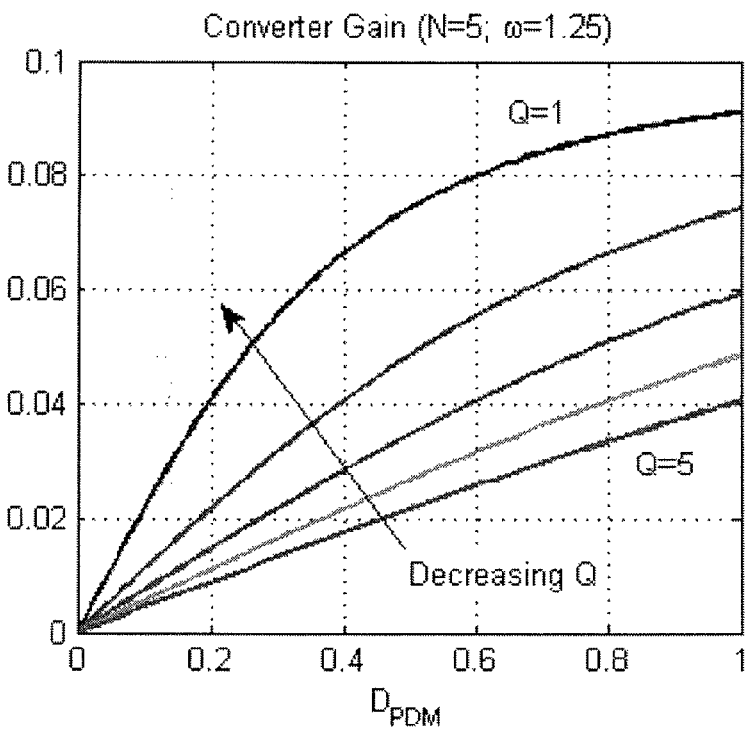

Voltage transfer characteristics from (3) are shown in FIGS. 3A and 3B for different circuit parameters. It is shown that the gain of the circuit decreases with increased quality factor and relative operating frequency. It is also observed that the influence of Q is reduced when operating close to the resonant frequency. At unity duty cycle $D_{PDM}$, the gain is equal to that of conventional control methods. The reduction of gain with duty cycle illustrates the ability to regulate the output against line and load variations through PDM duty cycle. From these curves, it is desirable to have a moderate value of $\omega$ and a fairly high Q to increase the range of duty cycle required for regulation.

The limit on $\omega$ is imposed by the acceptable conduction loss and required gain. For a given quality factor, there is a relative operating frequency that provides the required gain with some margin. Increasing the operating frequency beyond this requires a lower transformer turns ratio which increases conduction loss of the circuit.

At full load the circuit operates close to unity PDM duty cycle to keep the conduction loss close to that of traditional control techniques. At such operating point, the slight increase in conduction loss approximately cancels the slight reduction of gate loss, which results in efficiencies comparable to variable frequency control. However, as the load is reduced, frequency-dependent gate loss becomes the dominant loss component. Under light load conditions, the decrease in gate loss overshadows the conduction loss penalty to make the embodiments described herein more efficient than traditional control techniques.

Figure 4A:
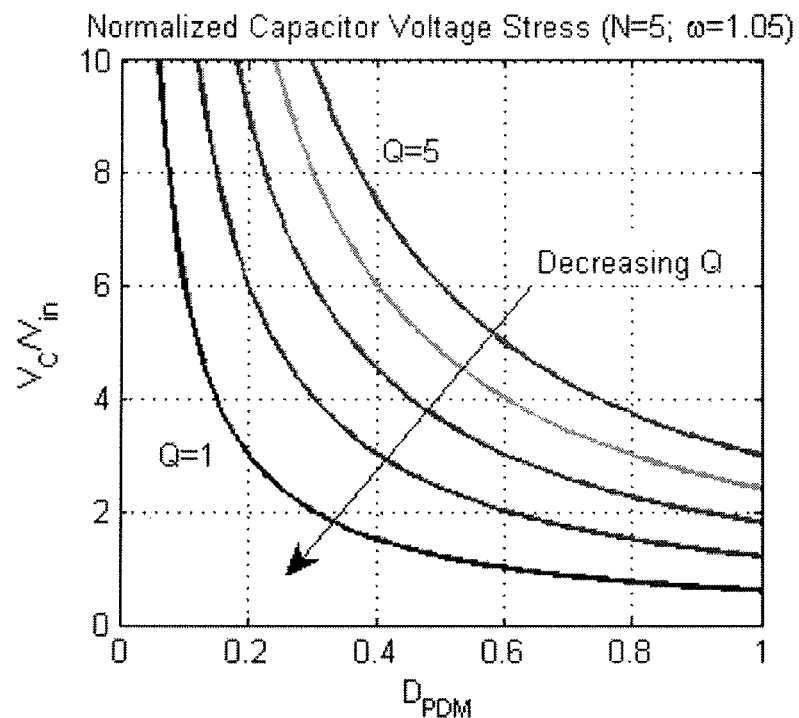
FIGS. 4A and 4B are plots of resonant capacitor voltage stress for an embodiment of the circuit of FIG. 1, for $\omega=1.05$ and $\omega=1.25$, respectively.
Figure 4B:
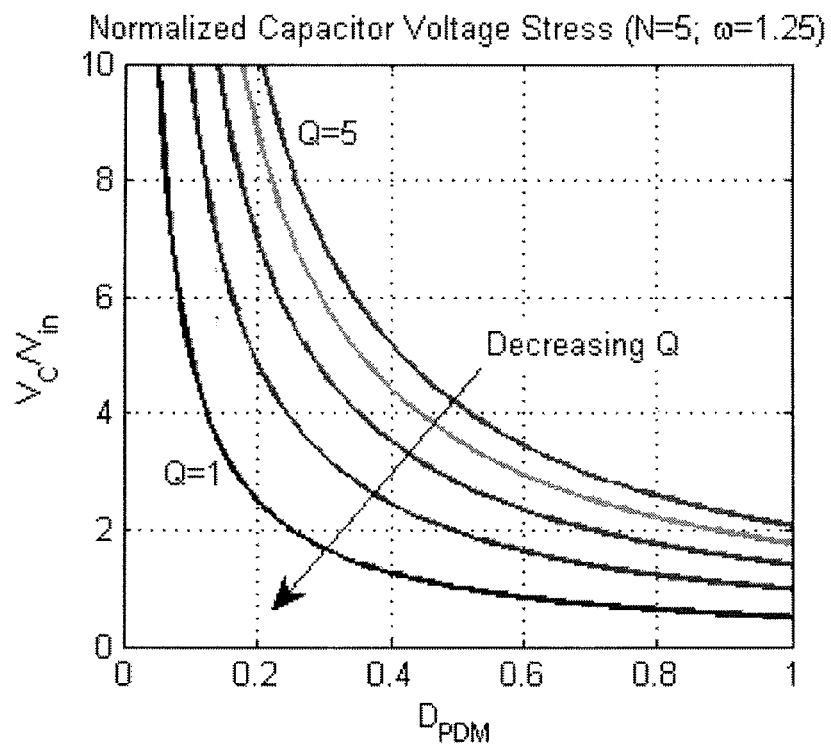
Figure 5A:
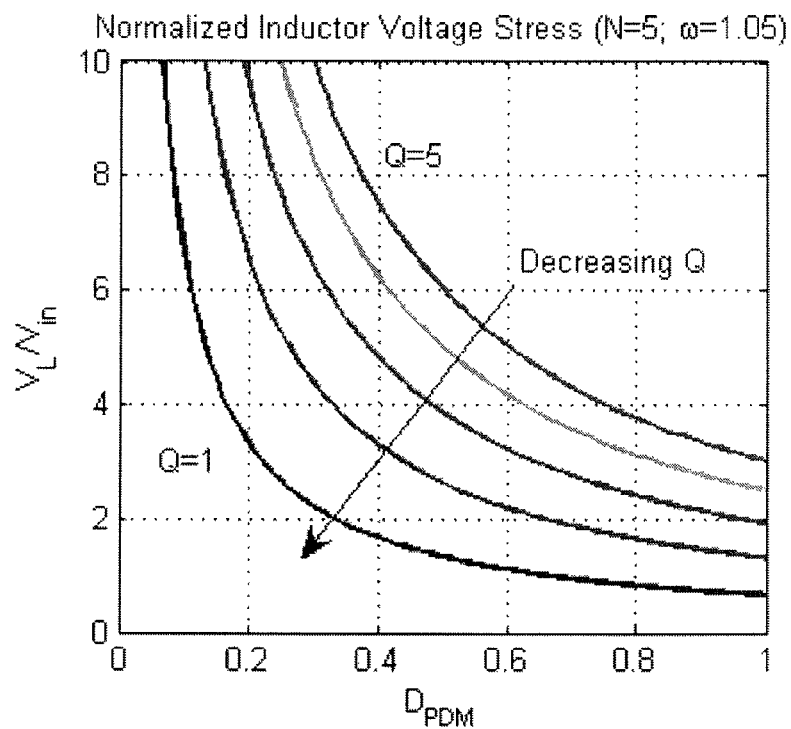
FIGS. 5A and 5B are plots of resonant inductor voltage stress for an embodiment of the circuit of FIG. 1, for $\omega=1.05$ and $\omega=1.25$, respectively.
Figure 5B:
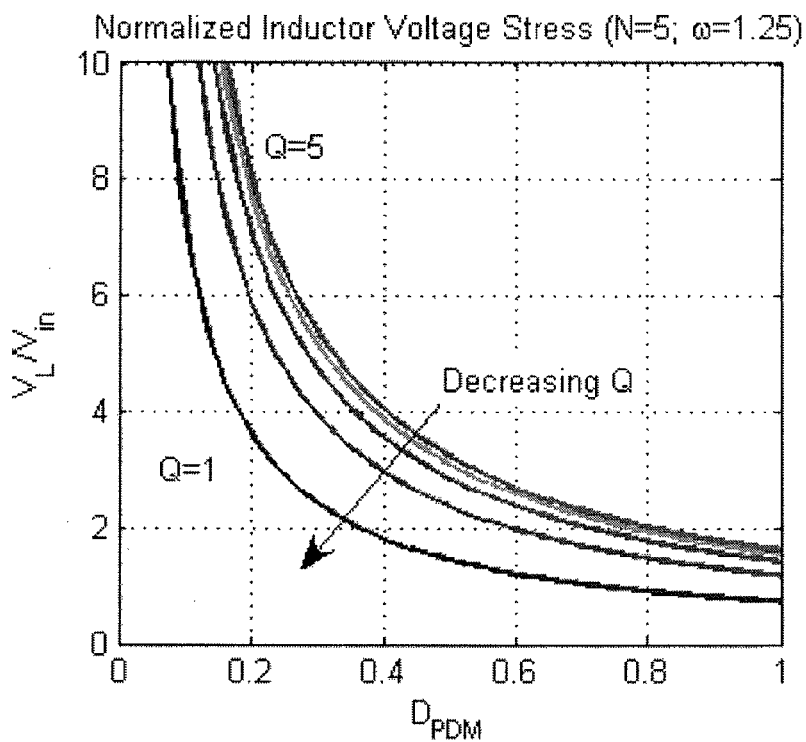

Evaluation of (4) and (5) yields component voltage stresses of the resonant tank at full-load, shown for $C_s$ in FIGS. 4A and 4B, and for $L_s$ in FIGS. 5A and 5B, for $\omega=1.05$ and $\omega=1.25$. In general, the stress increases with Q. For a given Q, the peak stress decreases as the operating frequency increases beyond the resonant frequency. Therefore, low Q and high $\omega$ are desirable for minimizing component stress.

From the above it will be appreciated that design of the SRC resonant tank is a trade-off between component stress and transfer capability. However, the voltage stress curves are somewhat misleading as it appears that the stress tends to infinity at low duty cycle, which would result in extremely oversized components. For a given set of tank parameters, the PDM duty cycle should be selected close to unity under the worst-case operating conditions. That way, the full-load stress is approximately the same as traditionally-controlled resonant converters, and when the duty cycle decreases with load, the peak stress remains roughly constant. Thus, component ratings will not increase beyond those for other control methods.

With a control technique as described herein, there is a relationship between hysteresis band, filter capacitor size, and clock frequency. The controller implementation is not limited by the clock frequency or resolution of commercially-available programmable logic. High clock frequency does not offer any significant improvement in performance.

The control method and circuit described herein achieve the efficiency benefits of PDM without the associated high output voltage ripple, discrete output power, or slow response. Further, by decoupling standard control variables from the control loop, the method achieves practical high frequency operation, simplifies component optimization, and promotes miniaturization. Accordingly, the method and circuit described herein are suitable for applications such as central processing unit (CPU) power supplies, particularly in notebooks, netbooks, and other mobile devices. Implementing a series resonant converter that uses a control technique as described herein reduces the size and cost of such power supplies, as well as improves performance.

In some embodiments, when the rising edge of the comparator is used to determine the beginning of a switching cycle, there will be a delay in synchronizing the switching circuit with the system clock. The net result, limited to the first switching cycle, is a drive-train duty cycle greater than 50% at a slightly lower switching frequency. Under APWM control, drive-train duty cycle has a gain proportional to sin ($\pi$D), with the maximum occurring at 50% duty cycle. Operating at lower frequency increases the gain of the tank. The resultant gain and soft-switching capability depends on the design of the resonant tank.

In some embodiments, if the comparator prematurely ends the switching cycle, the net effect will be excitation of the tank at a higher frequency, or an asymmetric excitation of the tank with a drive-train duty cycle less than 50%. In either case, the gain of the resonant network will be less than the ideal case of symmetric excitation at the desired switching frequency. Loss of soft-switching is possible in both cases; and dependent on resonant tank design and the instant in the switching cycle when the turn-off signal is applied. From the above discussions it will be apparent that a control technique as described herein may be combined with one or more other techniques. For example, one such other control method may regulate one variable of the RC output, and a method described herein may control a second variable of the RC output. As an example, in half-bridge implementations, variable frequency, self-sustained oscillation, or asymmetric pulse width modulation can be combined with a method described herein. As another example, in full-bridge implementations, phase-shift modulation, variable frequency, self-sustained oscillation, or asymmetric duty cycle can be used in conjunction with a method described herein.

As another example, one such other technique can regulate against line (input voltage) variations, while a method as described herein may regulate against load transients. Therefore, instead of the converter on-time being a group of fixed-frequency, 50% duty cycle square wave pulses, the on-time can be variable frequency symmetric pulses, or constant frequency asymmetric pulses; as determined by the second control loop. Further combinations are of course possible.

The invention is further described by way of the following non-limiting examples.

Example 1

Series Resonant Converter with Controller Implementation

This example addresses the dependency of hysteresis band, filter capacitor size, and clock frequency to provide rationale for the selection of each.
Analysis
Limitation of Conventional Digital Control The limitations of digital control are a result of traditional control techniques that rely on fine resolution of the controller to maintain regulation. For example, (6) and (7) are used to calculate the required resolution and clock frequency for a buck converter. At 500 kHz switching frequency, a 12 V to 1 V converter with analogue to digital (ADC) resolution of 10 mV, the required resolution of the digital PWM (DPWM) is 12 bits, and the clock frequency is 2.05 GHz. Such requirements are impractical for low cost, low power supplies.

$$N_{DPWM} = \log_2\left(\frac{1}{\Delta D}\right) + 1 = \left(\frac{V_{in}}{\Delta V_o}\right) + 1 \qquad (6)$$

$$f_{clk} = 2^{N_{DPWM}} f_s \qquad (7)$$

However, with a control technique as described herein, the frequency variation is due to the number of on/off cycles, not the frequency of the driving waveform. Further, the hysteretic comparator acts as a single bit ADC which removes resolution and sampling rate requirements from the controller. This allows the control circuit to be implemented with extremely low clock frequencies with minimal impact on performance.
Limitations of Present-Day Capacitor Technology The combination of high operating frequency and high current pushes the limits of present-day capacitor technology. As such, the effect of the equivalent series inductance (ESL) is more pronounced. In general, ESL is a function of the geometry of the capacitor, meaning larger packages will have greater ESL, as will larger capacitor values with the same package designation. Standard ceramic capacitors in 0805 packaging can have ESL in the nH range. For example, for a 22 μF capacitor this translates to a self resonant frequency (SRF) of approximately 1 MHz. As a result, standard capacitors are ineffective above about 500 kHz switching frequency.

To overcome the low self resonant frequency, low-ESL capacitors may be connected in parallel with standard capacitors to create a 'capacitor cell' with a self resonant frequency that is greater than the ripple frequency. A number of capacitor cells can then be used to form the output filter. Two options for low-ESL capacitors are reverse geometry and multi-terminal capacitors, with the latter offering superior reduction of ESL. The SRF of a capacitor cell can be calculated with (8), where capacitance and ESL are represented by C and l, and the subscripts std and low-ESL denote standard and low-ESL devices. The variable n represents the number of low-ESL capacitors used in the calculation.

$$SRF_{cell} = \left[2\pi\sqrt{(C_{std} + nC_{low-ESL})\left(l_{std} // \frac{l_{low-ESL}}{n}\right)}\right]^{-\frac{1}{2}} \qquad (8)$$

Figure 6:
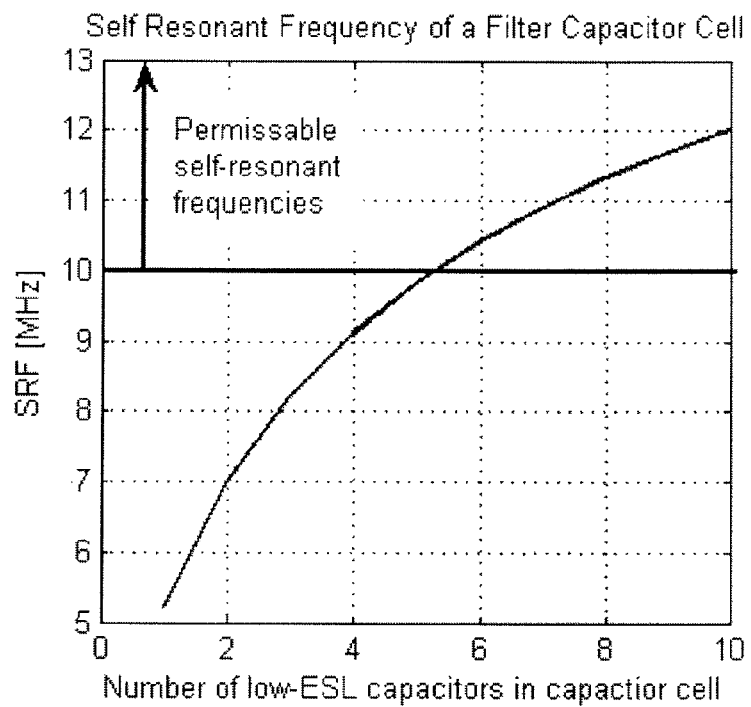
FIG. 6 is a plot of self resonant frequency (SRF) of a filter capacitor cell, used to find the required number of low-ESL capacitors for an embodiment of the circuit of FIG. 1.
Figure 7:
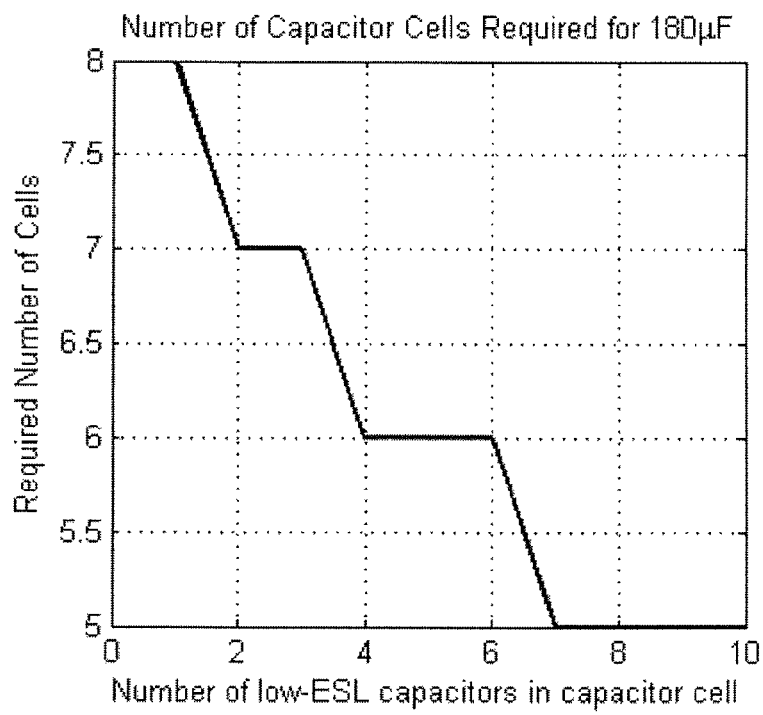
FIG. 7 is a plot of the number of capacitor cells as a function of filter requirements.
Figure 8:
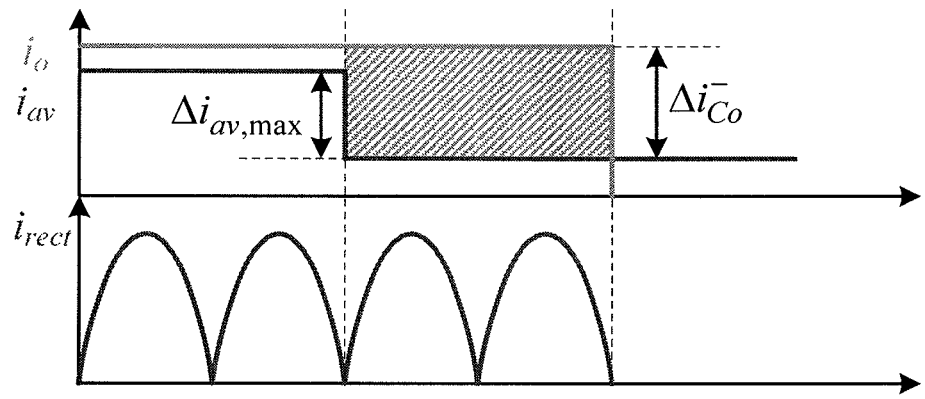
FIG. 8 is a plot showing waveforms during the worst-case unloading transient for the filter capacitor $C_o$ of an embodiment of FIG. 1.

Evaluation of (8) produces the plot of FIG. 6; where $C_{std}$=22 μF, $C_{low-ESL}$=2.2 μF, $l_{std}$=1.1 nH, and $l_{low-ESL}$=45 pH. The minimum number of low-ESL capacitors required for a design is determined by finding the intersection of the curve with the lowest permissible SRF; which is twice the switching frequency. The x-coordinate at this point or the next highest integer value in the event the point lies between two integers, is the minimum number of low-ESL capacitors required per cell. The number of cells required to at least meet the required filter capacitance value is found with FIG. 7.
Filter Size and Hysteretic Band The threshold voltages of the comparator, filter capacitor size, and allowable voltage range all impact the size and response of the converter. As with any converter, the filter size is limited by transient requirements. Analyses of both the loading and unloading transients provide a logical approach to controller implementation.
Unloading Transient Assumptions The filter capacitor $C_o$ size is defined by (9), and determined by the switching period $T_s$, the maximum output voltage $V_{o,max}$, the high threshold voltage $V_{TH}$, and the capacitor current during the maximum unloading transient (10). In (10), $\Delta i_{av,max}$ is the maximum load step, and $I_{av}$ is the load current. The worst case load current is the lowest that is still susceptible to the maximum load step. Here it is assumed that the maximum unloading transient only occurs at full-load. Waveforms of the worst-case unloading transient are shown in FIG. 8 where the command signal goes low the instant after a switching cycle has begun. The shaded region represents the extra charge the filter capacitor has to handle without exceeding the maximum voltage $V_{o,max}$.

$$C_o = \frac{\Delta i_{C_o} T_s}{(V_{o,max} - V_{TH})} \qquad (9)$$

$$i_{C_o} = I_{av}\left(\frac{D_{PDM}}{1 - D_{PDM}}\right) + \Delta i_{av,max} \qquad (10)$$

The relationship between high threshold voltage and the converter specifications and filter size is given by (11) and was obtained by isolating $V_{TH}$ in (9).

$$V_{TH} = V_{o,max} - \frac{\Delta i_{C_o} T_s}{C_o} \qquad (11)$$

Loading Transient Assumptions

Figure 9:
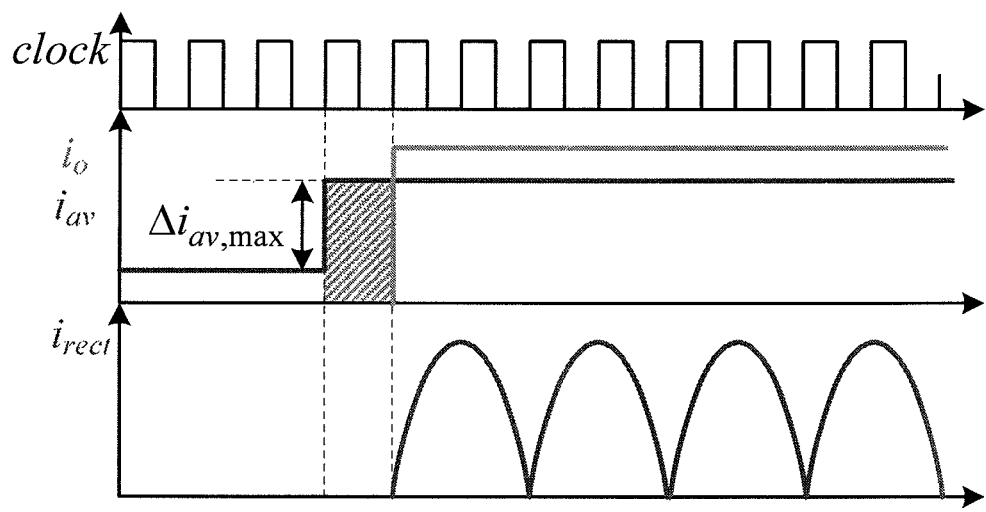
FIG. 9 is a plot showing waveforms during the worst-case loading transient for the filter capacitor $C_o$ of an embodiment of FIG. 1.

The equation for the lower threshold voltage $V_{TL}$, is given in (12) and was found by assuming one clock cycle delay in synchronizing with the digital clock; as illustrated in FIG. 9. This implementation uses a free-running clock as a means of ensuring consistent switching periods without issues of startup transients. However, the present embodiment only requires an oscillator during the on-time. From FIG. 9 it can be seen that the worst-case loading transient occurs immediately following the start of a clock period. In this situation the filter capacitor must supply the charge, shown as the shaded region, until a switching cycle can begin the next clock cycle.

$$V_{TL} = V_{o,min} + \frac{\Delta i_{av,max} T_{clk}}{C_o} \qquad (12)$$

Digital Clock Frequency

Unlike conventional digital controllers where high clock frequency is required to maintain stable operation, the present embodiment does not place strict requirements on clock speed. Thus the clock frequency may be relatively close to the switching frequency. From the above analysis, the only impact it has on transient performance is in the case of a positive load step. However, the filter is determined by the unloading transient, so the impact of clock frequency on transient response is almost negligible. It does play a role in the size of the hysteretic window, but only up to a certain frequency beyond which it provides diminishing returns.

In (13), $n_{clk}$ is the ratio of a switching period $T_s$ to a clock period $T_{clk}$. The relationship between converter requirements and the digital clock frequency with respect to switching frequency is found with (13).

$$n_{clk} = \frac{T_s}{T_{clk}} = \frac{f_{clk}}{f_0} \quad (13)$$

$$V_{TL} = V_{o,min} + \frac{\Delta i_{av,max}}{\Delta i_{Co} n_{clk}} (V_{o,max} - V_{TH}) \quad (14)$$

Average Output Voltage

While the allowable operating voltage window is defined by the droop resistance and the rated load current, the hysteretic threshold voltages determine the nominal output of the converter under static load. An approximation for the nominal output voltage is given by (15), which is the midpoint between the threshold voltages.

$$V_{o,avg} = \frac{V_{o,min} + V_{o,max}}{2} - \left[ \frac{\Delta i_{av,max}\left(\frac{n_{clk}-1}{n_{clk}}\right) + I_{av}\left(\frac{D_{PDM}}{1-D_{PDM}}\right)}{2C_o} \right] T_s \quad (15)$$

Design

SRC Filter Design Based on Unloading Transient

Figure 10A:
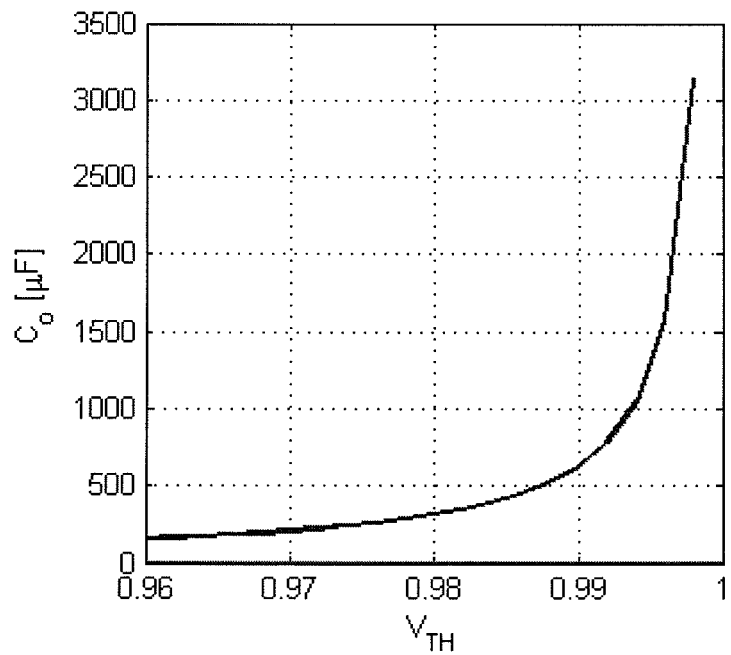
FIGS. 10A and 10B are plots showing impact of high threshold voltage on filter size: (A) for the full range of $V_{TH}$; (B) for a range of $V_{TH}$ requiring less than 450 μF of filter capacitance.
Figure 10B:
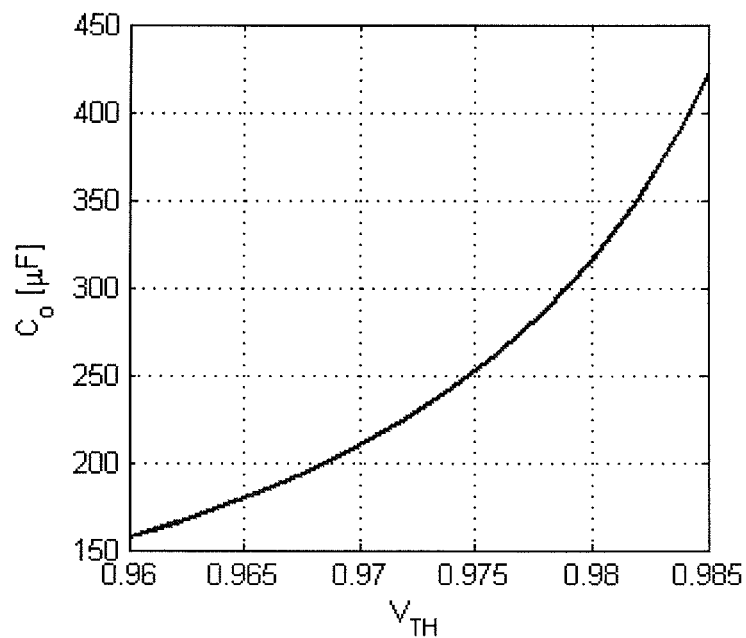

Plots of filter capacitor size determined from (18) as a function of high threshold voltage are shown in FIG. 10A for the full range of $V_{TH}$ and in FIG. 10B for a range of $V_{TH}$ requiring less than 450 µF of filter capacitance. The required filter size increases exponentially as the threshold voltage approaches the maximum output voltage. This is because as the allowable voltage deviation under the worst case transient is reduced, a larger capacitor is required to absorb the extra charge during a transient.

Clock Frequency and Filter Size

Figure 11:
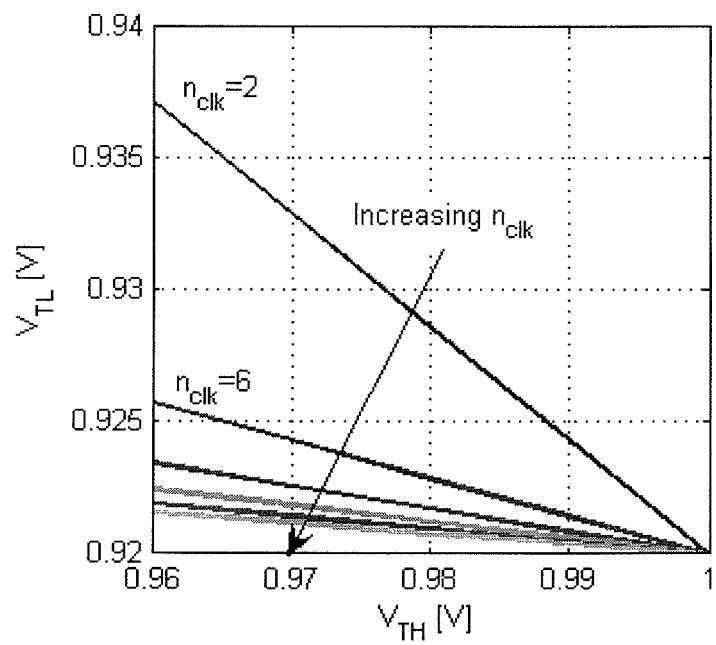
FIG. 11 is a plot of hysteretic window size as a function of high threshold voltage for a controller as described herein.
Figure 12:
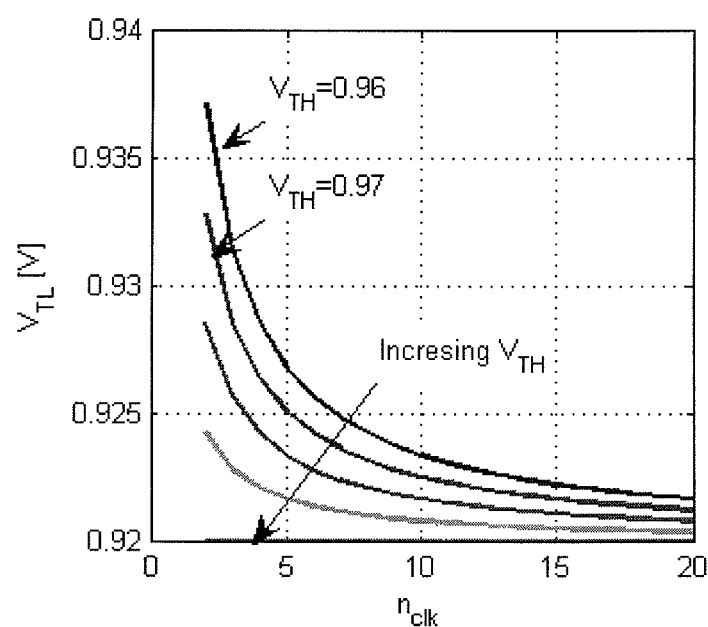
FIG. 12 is a plot showing impact of clock frequency on low threshold voltage for a controller as described herein.

The clock frequency of the digital circuit is dependent on the loading transient according to (12). However, since the filter size is determined by the unloading transient, (14) is used to determine the allowable value of the lower threshold voltage. FIG. 11 shows the impact of high threshold voltage on the low threshold voltage. As $V_{TH}$ approaches $V_{o,max}$ the low threshold voltage approaches $V_{o,min}$; which is congruent with the previous discussion on filter size and the high threshold voltage. Referring back to FIGS. 10A and 10B, a 20 mV increase in $V_{TH}$ from 0.96-0.98 V requires double the filter size, which only reduces the low threshold voltage by 3 mV for $n_{clk}$=6. The low threshold voltage is plotted against $n_{clk}$ in FIG. 12 to justify the selection of low clock frequency. As $n_{clk}$ increases, the allowable low threshold voltage approaches the minimum output voltage. However, the knees of the curves occur at $n_{clk}$=5, beyond which a further increase in clock frequency loses its effectiveness. At $V_{TH}$=0.97, increasing $n_{clk}$ from 4 to 6 allows a 2 mV reduction in the low threshold voltage. Such small returns may not justify arbitrary increases of the clock frequency. Furthermore, it shows that this implementation permits 100 MHz switching frequency with presently available programmable logic devices.

Converter Implementation

A series resonant converter under control as described herein, shown in FIG. 1, with the specifications given in Table I, was designed according to the above design criteria. The output voltage specifications were chosen to correspond to a 1 V, 40 A VR with 2 mΩ load line. Whereas a buck converter would adapt its output voltage for a given load, and overshoot the upper bound during unloading transients, an SRC under this control maintains its output voltage within the allowable 80 mV range regardless of operating conditions.

TABLE I

Series Resonant Converter Specifications

| Parameter | Value |
| --- | --- |
| Input Voltage ($V_{in}$) | 12 V +/− 10% |
| Output Voltage ($V_o$) | 0.92-1.0 V |
| Output Current ($i_{av}$) | 40 A |
| Maximum Load Step ($\Delta i_{av, max}$) | 27 A (40 A ↔ 13 A) |
| Switching Frequency ($f_0$) | 5 MHz |

From the above design criteria, design of the resonant tank is a trade-off between component stress and transfer capability. Conveniently, low quality factor not only reduces component stress, but also improves the response of the converter.

For a given set of tank parameters, the PDM duty cycle is selected close to unity under the worst-case operating conditions. That way, the full-load stress is approximately the same as that in traditionally-controlled resonant converters, and when the duty cycle reduces with load, peak stress remains approximately constant. Thus, component ratings do not increase beyond those for other control methods.

Resonant parameters of ω=1.15 and Q=1.8 were selected for the design. At 5 MHz switching frequency, these parameters translate to component values: Cs=42 nF and Ls=31 nH. For these specifications, an ideal filter capacitor requirement of 180 µF was calculated. Six 22 µF capacitors ($C_{std}$) in 0805 packaging with 1.1 nH ESL ($l_{std}$) were used in parallel to form the foundation of the filter. FIG. 6 was used to determine the minimum number of low-ESL capacitors required in each cell by finding the point on the curve with a y-coordinate equal to the minimum acceptable SRF value. The x-coordinate of this point or the next highest integer value in the event the point lies between two integers, is the minimum number of low-ESL capacitors required per cell. The number of cells required to at least meet the required filter capacitance value was found with FIG. 7 simply by using the result from FIG. 6 along the x-axis and reading the corresponding y-value. Thus, in this design six low-ESL capacitors were required per capacitor cell, and six cells were required for the filter to obtain a self resonant frequency of the filter above 10 MHz.

Controller Simulation

Figure 13A:
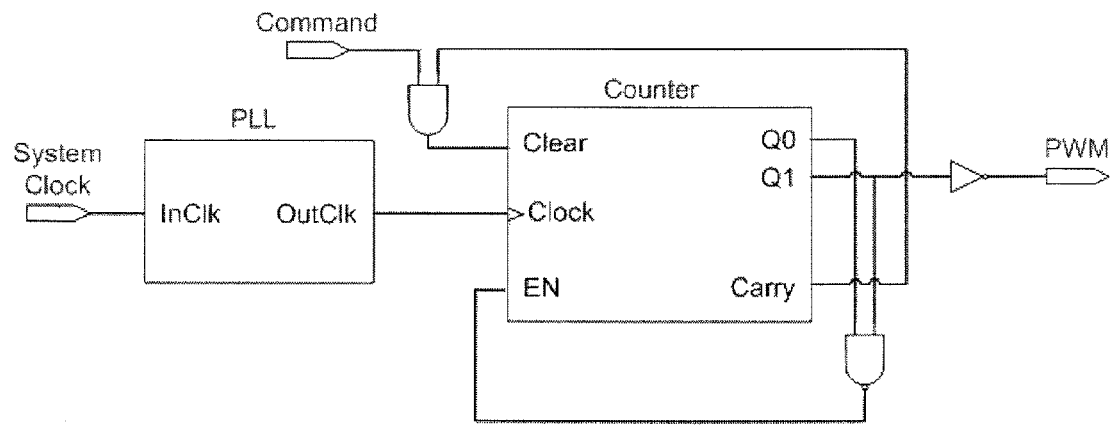
FIGS. 13A and 13B are schematic diagrams of embodiments of a controller as described herein.
Figure 13B:
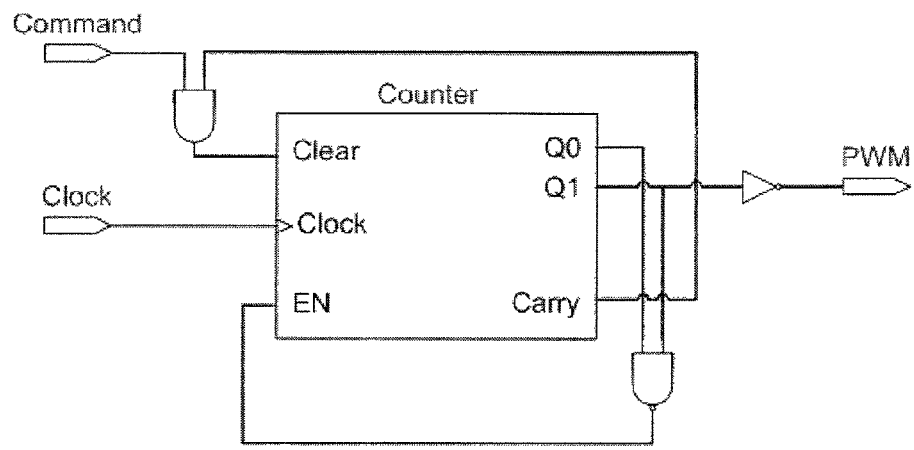
Figure 14:
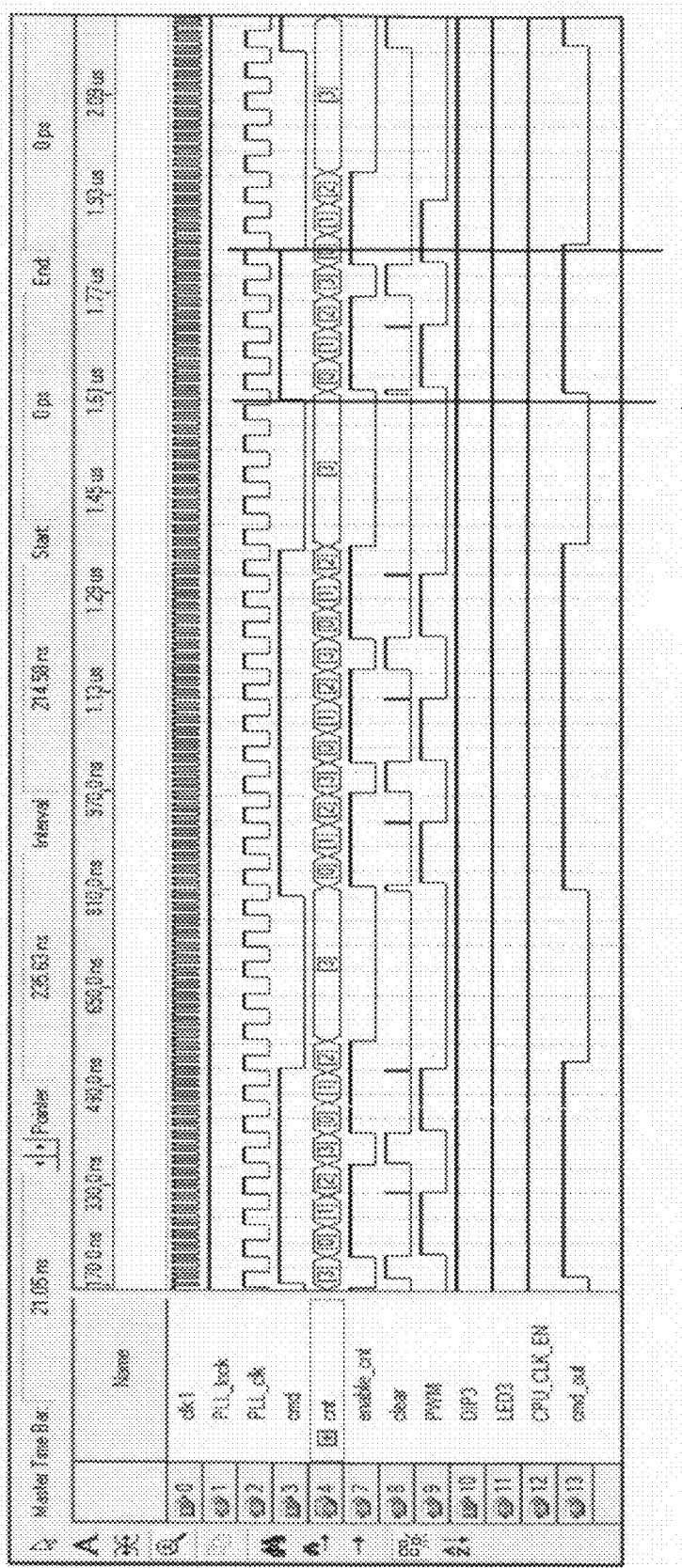
FIG. 14 shows waveforms generated from a simulation based on the controller of FIG. 13A.

A controller based on the above design criteria was implemented in Altera® Quartus® II software (Altera Corporation, San Jose, Calif.). The schematic is shown in FIG. 13B. Results of the simulation are shown in FIG. 14. The key waveforms are the 100 MHz system clock, clk1 (line 0); the controller clock, PLL_clk (line 2); the command signal, cmd (line 3); and controller output, PWM (line 9). Time instants $t_1$ and $t_2$ are indicated to show that the output behaves as expected. At $t_1$ the command signal goes high in the middle of a clock cycle, but the PWM output does start until the next rising edge of the PLL_clk. At $t_2$ the command signal falls shortly after a PWM cycle begins; however, the cycle continues to maintain constant switching frequency.

Converter Simulation

Figure 15:
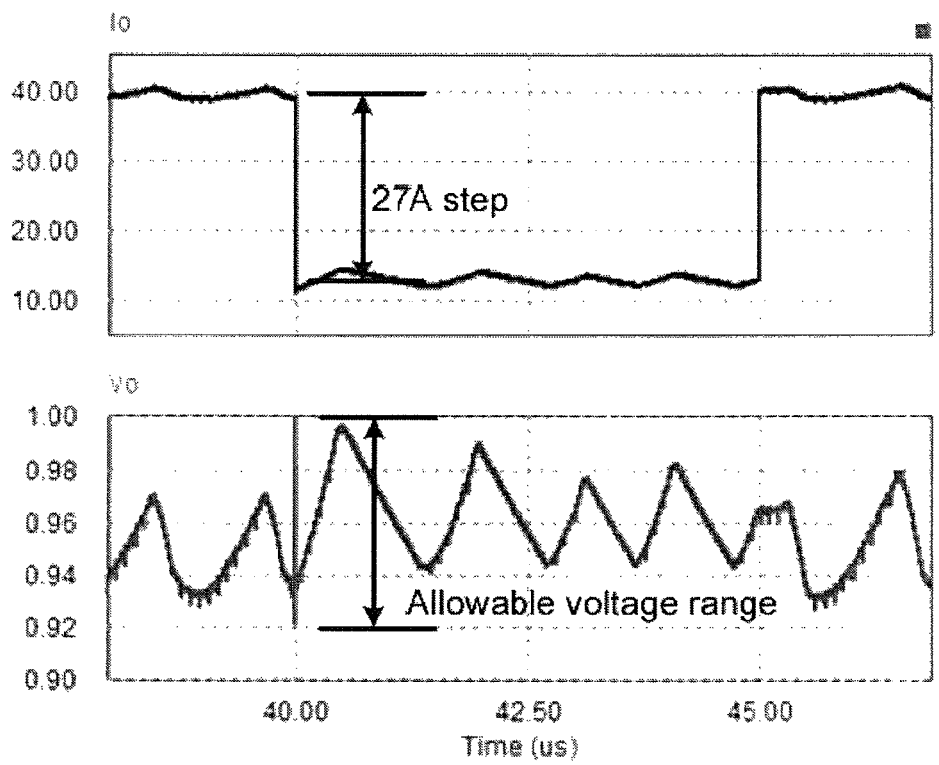
FIG. 15 is a plot of current and voltage responses to a simulated transient of an embodiment of the circuit of FIG. 1.
Figure 16:
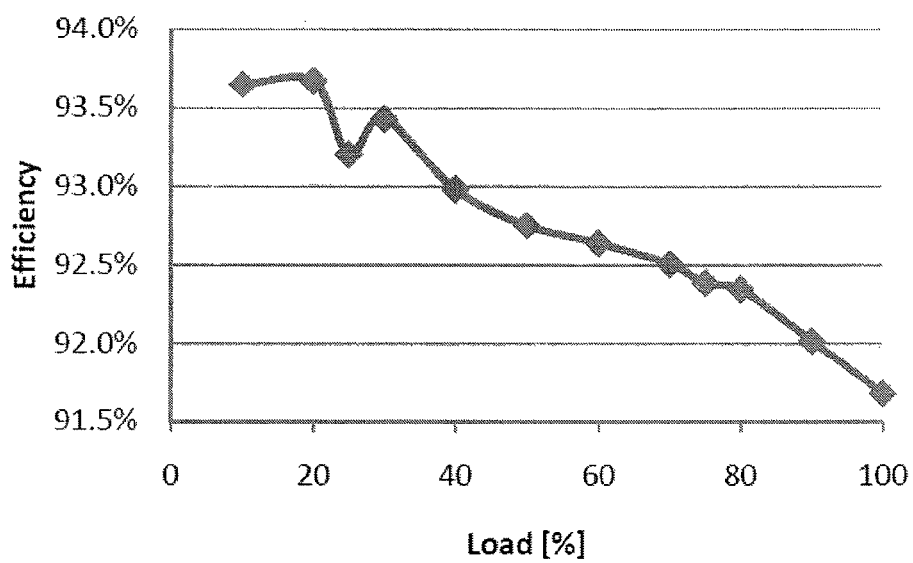
FIG. 16 is a plot of semiconductor efficiency for a SRC with a controller according to an embodiment of the circuit of FIG. 1.
Figure 17:
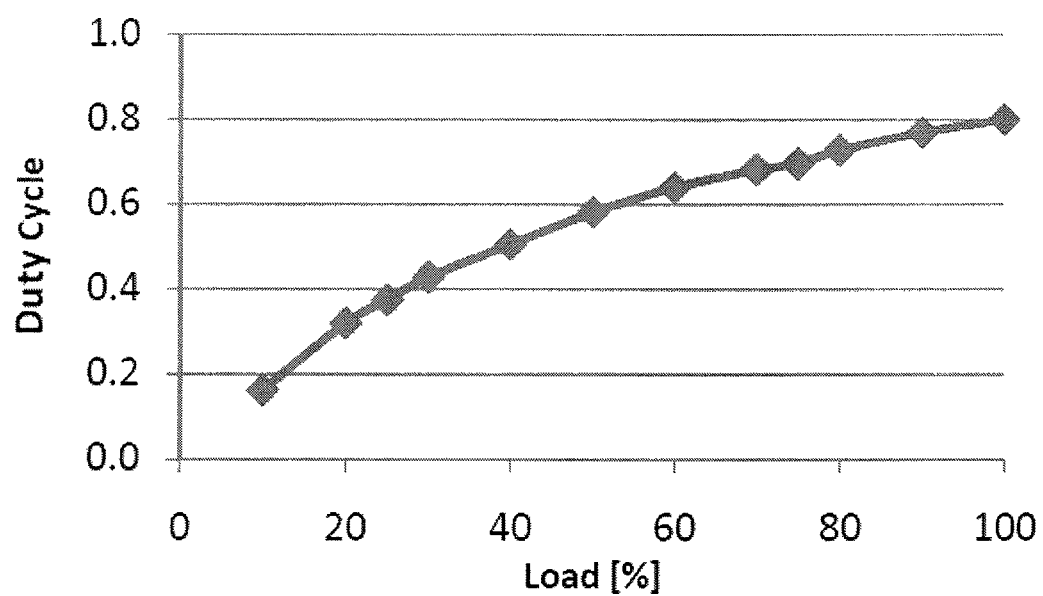
FIG. 17 is a plot of PDM duty cycle as a function of load range at 12 V input, for a SRC with a controller according to an embodiment of the circuit of FIG. 1.

Simulation results are shown in FIG. 15. A total of 211.2 μF of filter capacitance was used to achieve these results, which is only that high due to limitations of current capacitor technology. Improvements in capacitor technology will enable further miniaturization through filter size reduction with this control technique. In comparison, a two-phase buck converter (L=300 nH) would require 700 μF of capacitance to obtain the same results; i.e., 3.3 times more capacitance than a practical SRC. In FIG. 16, the semiconductor efficiency results are shown for the simulated converter across the load range; assuming full recovery of the gate energy of the synchronous rectifiers. Soft-switching and pulsed operation maintains efficiency greater than 91% across the load range. Further, the efficiency increases with load reduction, which is the contrary to typical converter behaviour. This can be explained by FIG. 17 where the duty cycle is shown across the operating range of the converter. At light load, the conduction loss is reduced through natural current reduction and increased off-time of the converter; as well as through the maintenance of soft-switching. While transformer losses and conduction loss of the traces and resonant and filter capacitors are not accounted for, symmetrical constant frequency operation of the converter minimizes these as well.

Experimental Results

An Altera® UP3 Education Board with EP1C6Q240C8 Cyclone™ field programmable gate array (FPGA) (Altera Corporation, San Jose, Calif.) was programmed to implement a controller based on the above design criteria. The schematic is shown in FIG. 13A, and includes a phase locked loop (PLL). The PLL was available on the FPGA and was conveniently used as a clock divider, which was needed because of the high frequency clock (100 MHz) provided on the FPGA. Those skilled in the art will know of other ways to make a lower frequency clock from a high frequency clock. The PLL or other clock divider may be eliminated where a lower frequency clock (e.g., 4× the switching frequency) is available (see FIG. 13B).

Figure 18:
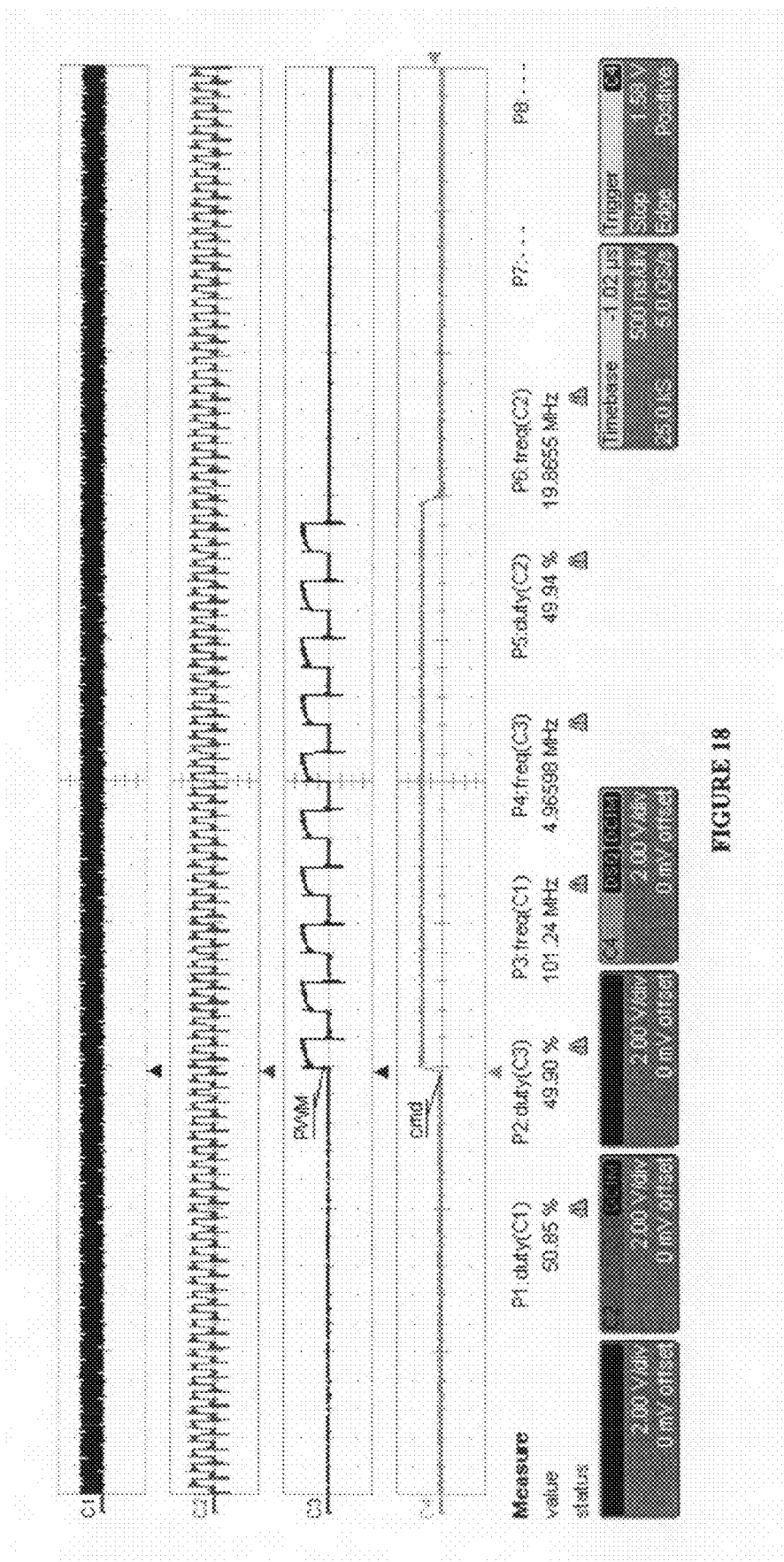
FIG. 18 is a plot showing open loop results of a field programmable gate array (FPGA) programmed to implement an embodiment of a controller as described herein.
Figure 19:
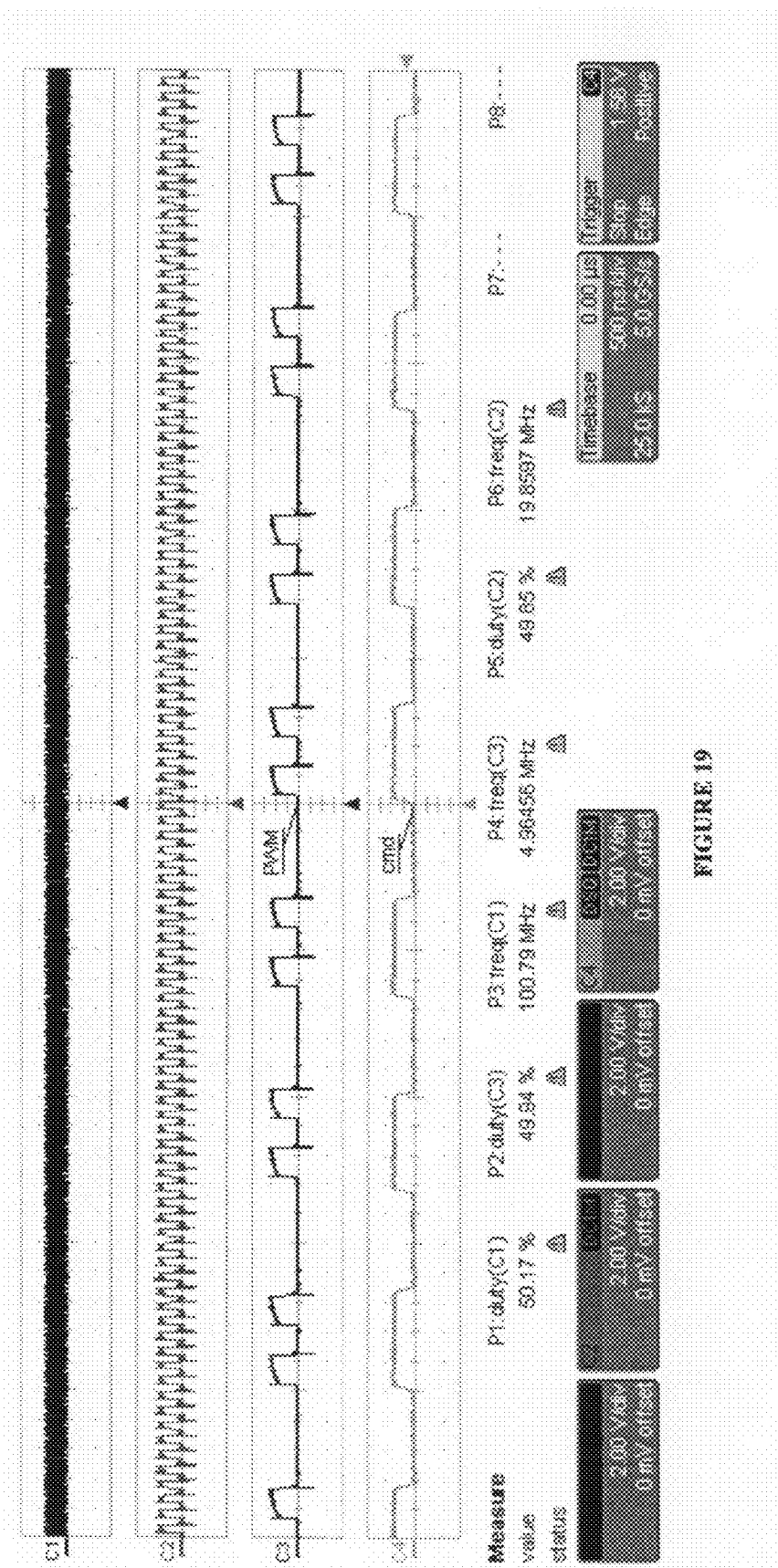
FIG. 19 is a plot showing output of a controller implemented with a FPGA, with a 1.5 MHz command signal, according to one embodiment.
Figure 20:
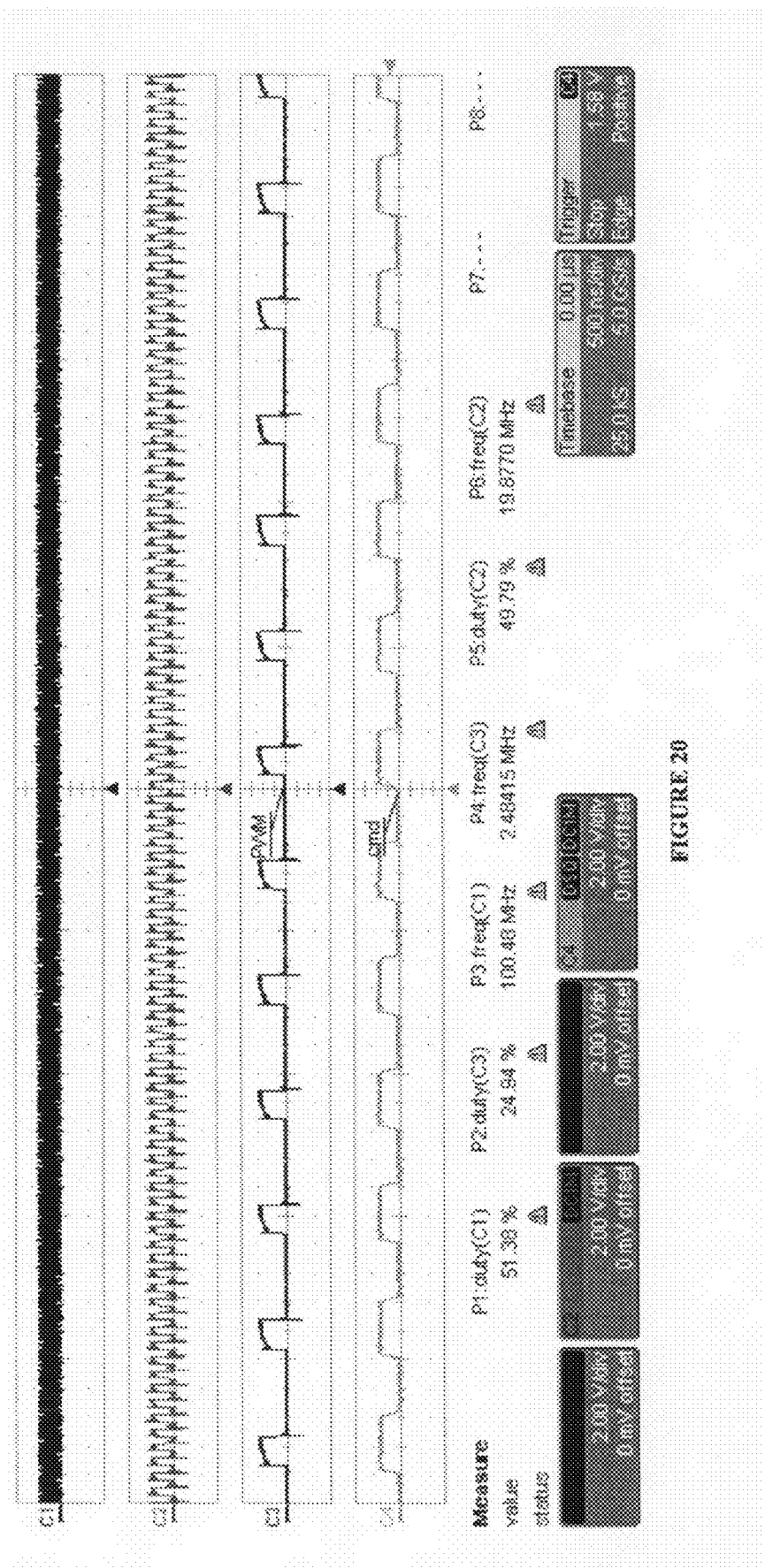
FIG. 20 is a plot showing output of a controller implemented with a FPGA, with a 2.5 MHz command signal.
Figure 21:
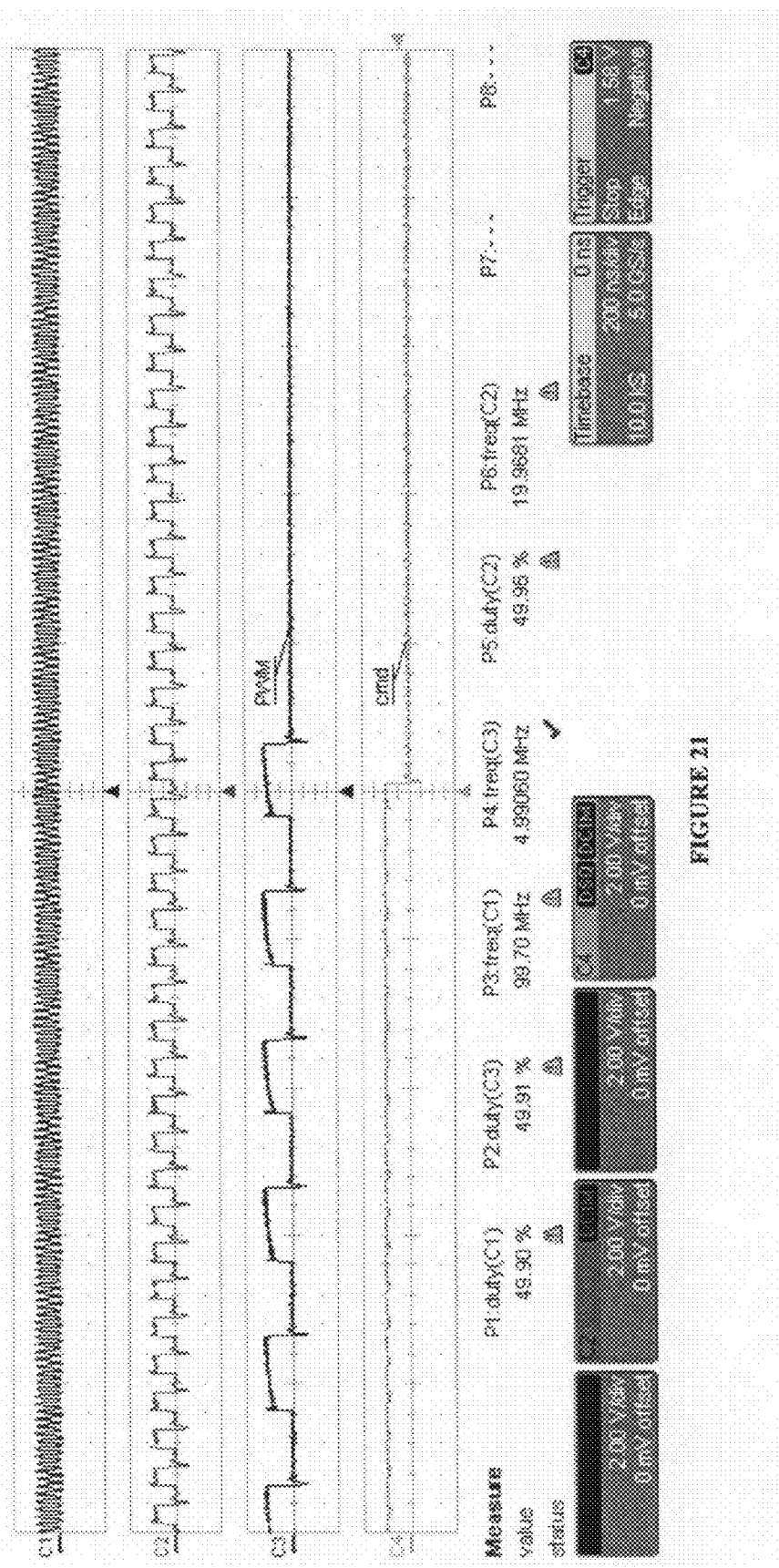
FIG. 21 is a plot showing output of a controller implemented with a FPGA, when the command signal goes low in the middle of a switching cycle.

To verify correct operation of the controller, command signals of varying frequencies were fed into the FPGA, and the resulting PWM signal was measured. The top trace in FIGS. 18 to 21 is the 100 MHz clock generated by an on-board oscillator. The second trace is the phase-locked loop (PLL) output, which acts as the clock for the designed logic. A clock frequency of 20 MHz ($n_{clk}$=4) was chosen based on the results of the analysis presented above. As shown in FIG. 18, the PWM signal (third trace) is active when the command signal (bottom trace) is high; and inactive otherwise. To highlight the speed of the controller, the results for 1.5 MHz and 2.5 MHz command signals are shown in FIGS. 19 and 20, respectively. In FIG. 21 it can be seen that the controller output maintains a constant switching frequency despite the command signal falling shortly after the switching cycle begins.

All cited publications are incorporated herein by reference in their entirety.

EQUIVALENTS

While the invention has been described with respect to illustrative embodiments thereof, it will be understood that various changes may be made to the embodiments without departing from the scope of the invention. Accordingly, the described embodiments are to be considered merely exemplary and the invention is not to be limited thereby.

REFERENCES

[1] R. L. Steigerwald, A Comparison of Half-Bridge Resonant Converter Topologies, *IEEE Trans. Power Elec.*, vol. 3, pp. 174-182, April 1988.

[2] P. K. Jain, A. St-Martin, and G. Edwards, Asymmetrical pulse-width-modulated resonant DC/DC converter topologies, *IEEE Trans. Power Elec.*, vol. 11, pp. 413-422, May 1996.

[3] P. Jain, Asymmetrical PWM Resonant DC/DC Converter, Canadian Patent No. 2,080,027, November 1997.

[4] S. Pan, and P. K. Jain, Secondary-side adaptive digital controlled series resonant dc-dc converters for low voltage high current applications, in *Proc. Power Elec. Specialists Conf.*, pp. 711-717, 2008.

[5] S. Dalapati, S. Ray, S. Chaudhuri, and C. Chakraborty, Control of a series resonant converter by pulse density modulation, in *Proc. IEEE India Annual Conf. (INDICON)*, pp. 601-604, 2004.

[6] H. Fujita, H. Akagi, K. Sano, K. Mita, and R. H. Leonard, Pulse density modulation based power control of a 4 kW 400 KHz voltage-source invertor for induction heating applications, in *Proc. Power Conversion Conf.*, pp. 111-116, 1993.

[7] H. Koizumi, K. Kurokawa, and S. Mori, Analysis of class d inverter with irregular driving patterns, *IEEE Trans. Circuits and Sys.*, vol. 53, pp. 677-687, March 2006.

[8] Y.-H. Liu, S.-C. Wang, Y.-F. Luo, Digital dimming control of CCFL drive system using pulse density modulation technique, in *Proc. IEEE Region 10 Conf.*, pp. 1-4, 2007.

[9] D. D-C Lu, J. C. P. Liu, F. N. K. Poon, and B. M. H. Pong, A Single phase voltage regulator module (VRM) with stepping inductance for fast transient response, *IEEE Trans. Power Elec.*, vol. 22, pp. 417-424, March 2007.

[10] X. Wang, I. Batarseh, S. A. Chickamennahalli, and E. Standford, VR transient improvement at high slew rate load-active voltage transient voltage compensator, *IEEE Trans. Power Elec.*, vol. 22, pp. 1472-1479, July 2007.

[11] D. J. Tschirhart, and P. K. Jain, A CLL resonant asymmetrical pulse width-modulated converter with improved efficiency, *IEEE Trans. Industrial Elec.*, vol. 55, pp. 114-122, January 2008.

The invention claimed is:

1. A method of controlling a resonant power converter, comprising:
   comparing an output voltage or current of the converter to at least one reference voltage or current; and
   operating one or more primary side switches of the resonant power converter by:
   (i) enabling primary side switching signals based on a first selected result of the comparison; and
   (ii) disabling primary side switching signals based on a second selected result of the comparison;
   wherein a primary side switching signal for each primary side switch includes at least one off-on-off transition;
   wherein the operating one or more primary side switches of the resonant power converter by enabling and disabling primary side switching signals regulates the output voltage or current.

2. The method of claim 1, wherein the primary side switching signals for a pair of primary side switches are edge-synchronous, opposite polarity, and have 50% duty cycle.

3. The method of claim 1, including deriving a frequency of the primary side switching signals from a clock frequency.

4. The method of claim 3, wherein an on period of the primary side switching signals is an integer multiple of a clock period and is synchronized with the clock frequency.

5. The method of claim 3, including using a counter to derive the switching frequency from the clock frequency.

6. The method of claim 5, wherein the counter begins counting at a next clock edge upon receiving the first selected result of the comparison.

7. The method of claim 6, wherein the next clock edge is positive.

8. The method of claim 1, wherein the first selected result of the comparison is when the converter output voltage or current falls below at least one reference voltage or current.

9. The method of claim 3, wherein the clock frequency is a multiple of the switching frequency and the primary side switching signals are enabled with a delay of less than one switching cycle.

10. The method of claim 1, including disabling the primary side switching signals according to the second selected output of the comparison when a converter switching cycle is complete.

11. The method of claim 10, wherein the primary side switching signals are disabled with a delay of less than one switching cycle.

12. The method of claim 1, wherein enabling and disabling the primary side switching signals turns the converter on and off, respectively, with zero current transitions, and maintains zero voltage switching or zero current switching while the converter is on.

13. The method of claim 1, including controlling two or more phases of resonant converters.

14. A controller for a resonant power converter, comprising:
 a comparator that compares an output voltage or current of the converter to at least one reference voltage or current and generates results based on the comparison; and
 a circuit that operates one or more primary side switches of the resonant power converter by:
 enabling primary side switching signals based on a first selected result of the comparison; and
 disabling primary side switching signals based on a second selected result of the comparison;
 wherein a primary side switching signal for each primary side switch includes at least one off-on-off transition;
 wherein the operating one or more primary side switches of the resonant power converter by enabling and disabling primary side switching signals regulates the output voltage or current.

15. The controller of claim 14, wherein the primary side switching signals for a pair of primary side switches are edge-synchronous, opposite polarity, and have 50% duty cycle.

16. The controller of claim 14, wherein the circuit derives a frequency of the primary side switching signals from a clock frequency.

17. The controller of claim 16, wherein an on period of the primary side switching signals is an integer multiple of a clock period and is synchronized with the clock frequency.

18. The controller of claim 16, including a counter that derives the switching frequency from the clock frequency.

19. The controller of claim 14, wherein two or more phases of resonant converters are controlled.

20. A resonant converter, including:
 a resonant power converter circuit; and
 the controller of claim 14 electrically connected to the resonant power converter circuit.

* * * * *

UNITED STATES PATENT AND TRADEMARK OFFICE
CERTIFICATE OF CORRECTION

PATENT NO.       : 8,638,571 B2                                    Page 1 of 1
APPLICATION NO.  : 13/030737
DATED            : January 28, 2014
INVENTOR(S)      : Darryl J. Tschirhart and Praveen K. Jain It is certified that error appears in the above-identified patent and that said Letters Patent is hereby corrected as shown below:

In the Claims

Column 16, claim 20, line 28: replace "A resonant converter, including:" with

--A power converter, including:--

Signed and Sealed this
Fifth Day of August, 2014

Michelle K. Lee
*Deputy Director of the United States Patent and Trademark Office*